United States Patent

Ban

[15] 3,684,298

[45] Aug. 15, 1972

[54] TAPE SPEED CHANGING APPARATUS

[72] Inventor: Itsuki Ban, 829, Higashi-Oizumimachi, Nerima-ku, Tokyo-to, Japan

[22] Filed: June 25, 1970

[21] Appl. No.: 48,009

[52] U.S. Cl.............274/4 D, 74/242.3, 179/100.2 S, 179/100.1 VC, 226/40, 226/178

[51] Int. Cl..........................G11b 19/26, G11b 15/44

[58] Field of Search.........226/40, 41, 178; 74/242.3, 74/242.15; 179/100.2 Z; 274/4 D, 4 B, 11 B, 11 D, 11 E, 11 G

[56] References Cited

UNITED STATES PATENTS

| | | | |
|---|---|---|---|
| 3,248,961 | 5/1966 | Bortzfield | 74/242.3 |
| 3,494,528 | 2/1970 | Suzuki | 274/4 G |
| 3,121,575 | 2/1964 | Bourgi | 74/242 |
| 2,986,318 | 5/1961 | Tiger | 226/178 |
| 2,396,409 | 3/1946 | Berzer | 179/100.2 S |
| 2,504,529 | 4/1950 | Isom | 74/242.4 |
| 2,550,952 | 5/1951 | Allen | 74/242.3 |

*Primary Examiner*—Leonard Forman
*Assistant Examiner*—Dennis A. Dearing
*Attorney*—Jacobs and Jacobs

[57] ABSTRACT

A tape speed changing apparatus in an endless magnetic tape cartridge player comprising a capstan for driving the tape, a motor rotatably driving the capstan, a plurality of pulleys mounted to the output of the motor and having different diameters from each other, a belt extending between one pulley and the flywheel on the capstan to impart rotation of the one of the pulleys to the capstan, and a shift means for moving the belt to selectively shift the belt from pulley to pulley, and wherein the shift means is selectively operated by the cartridge set in the predetermined operative position, the rotational speed of the capstan being automatically changed to vary the tape drive speed in accordance with the class of the cartridge having the tape speed when recording.

5 Claims, 6 Drawing Figures

TAPE SPEED CHANGING APPARATUS

BACKGROUND OF THE INVENTION

This invention relates to an endless magnetic tape cartridge player, and more particularly to a tape speed changing apparatus in the endless magnetic tape cartridge player.

The magnetic tape in the cartridge is normally recorded at tape speed of 9.5 cm/second or 4.75 cm/second. In reproducing such recorded tape, the tape is required to be driven at the same speed as that in recording. If the tape cartridge player is adapted to only drive the tape in a limited manner such as 9.5 cm/second tape speed rate, the tape recorded at speed of 4.5 cm/second cannot be reproduced. This will require another tape cartridge player to this end. It is apparent from this that the tape cartridge has been required which is provided with a tape driving device capable of changing the tape speed as the case may be.

On the other hand, it is customary to fast transport the tape through the portion that is not desired to reproduce. According to the endless magnetic tape cartridge player, in case that the tape speed is changed irrespective fast or normal, it is practiced to vary the rotational speed of the capstan for driving the tape.

In view thereof, the inventor has succeeded in obtaining a tape speed changing apparatus providing a simple arrangement by which the rotational speed of the capstan may be changed to drive the tape at the same speed as that in recording and to fast drive the tape, if necessary.

SUMMARY OF THE INVENTION

It is a primary object of the invention to provide a tape speed changing apparatus in an endless magnetic tape cartridge player, which is capable of changing the tape speed according to the cartridge set in the operative position so as to drive the endless magnetic tape in the tape cartridge at the same speed as that when the tape is recorded.

Another object of the invention is to provide a tape speed changing apparatus in an endless magnetic tape cartridge player, which includes a plurality of pulleys of different diameters to each other, the rotation of each pulley being selectively imparted by a belt to a flywheel on a capstan for driving the tape to rotate the capstan at different speed thereby properly changing the tape speed.

A further object of the invention is to provide a tape speed changing apparatus in an endless magnetic tape cartridge player, which has a shift means for selectively shifting the belt to one of the pulleys, the shift means being selectively operated by the cartridge set in the operative position in a manner that the belt is trained to the smallest pulley when the cartridge with the tape recorded at 4.75 cm/second tape speed is set in the operative position or the belt is trained to the pulley of diameter twice as the smallest pulley when the cartridge with the tape recorded at 9.5 cm/second tape speed is set in the operative position.

Yet another object of the invention is to provide a tape speed changing apparatus in an endless magnetic tape cartridge player, wherein the shift means is manually operated by an operating lever to shift the belt to the largest pulley to thus rotate the capstan at high speed thereby driving the tape at fast speed.

Still another object of the invention is to provide a tape speed changing apparatus in an endless magnetic tape cartridge player, wherein in response to passage of the non-recorded zone between one recorded zone and the next recorded zone on the tape through the magnetic head, the belt is shifted from the largest pulley to the other pulley to automatically end the tape fast feed and the running speed of the tape is changed to the normal playing speed.

These and other objects of the invention will be apparent from the following description and accompanying drawings in which;

DESCRIPTION OF THE PREFERRED EMBODIMENTS

Figure 1:
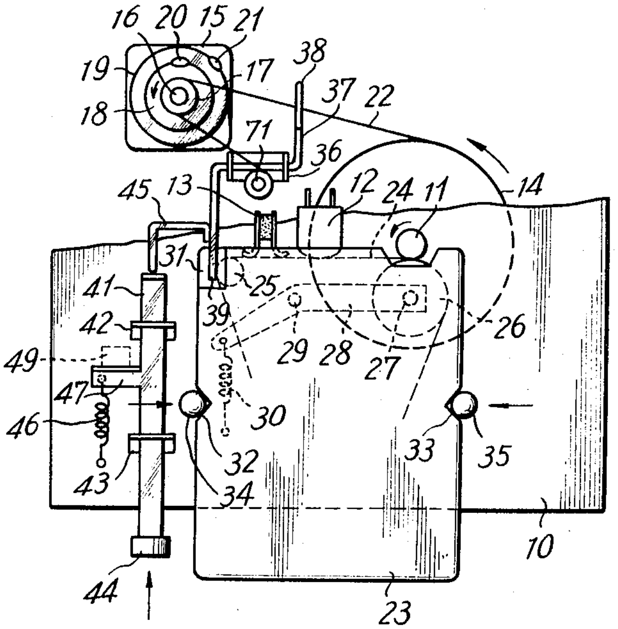
FIG. 1 is an explanatory representation of an endless magnetic tape cartridge player to which one embodiment of a tape speed changing apparatus of the present invention is applied.
Figure 2:
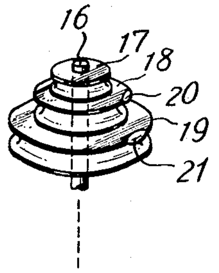
FIG. 2 is an enlarged perspective view showing the pulleys connected to the output shaft of the motor shown in FIG. 1.

Referring to the drawings, particularly to FIG. 1, numeral 10 designates a horizontal deck mounted within a player housing (not shown) for an endless magnetic tape cartridge player. The deck 10 carries a capstan 11, a magnetic head 12, and an endmark detector 13 thereon. The capstan 11 is rotatably supported by a suitable bearing (not shown) rigidly fixed to the deck 10 and passes through a hole (not shown) formed on the deck and extends upwardly of the deck. A flywheel 14 is attached to the capstan 11 at its lower end and is rotatably driven by a motor 15 immovably mounted in the player housing (not shown). As best seen from FIG. 2, a small pulley 17, a medium pulley 18, and a large pulley 19 are provided about an output shaft 16 of the motor 15. The medium pulley 18 and the large pulley 19 are respectively provided with projecting parts 20 and 21 at their peripheries. Each of the pulleys 17, 18 and 19 are bodily rotatable with the output shaft 16 of the motor 15 and are coupled by a belt 22 to the flywheel 14 as will be fully described later.

The magnetic head 12 is adapted to transduce an endless magnetic tape 24 in an endless magnetic tape cartridge 23 inserted into the player housing for the play thereof. The magnetic head 12 may be properly moved by a shifting means not shown and forming no part of this invention to position opposed to one of a plurality of record tracks on the tape 24. The shifting means (not shown) may move the magnetic head 12 by one step in response to detection by the endmark detector 13 of an endmark (not shown) of conductive foil on the tape 24. The tape cartridge 23 comprises a generally rectangular container accommodating therein the tape 24 helically wound in a conventional manner, a guide post 25 for the tape 24, and a pinch roller 26, though they are shown in schematic manner. The pinch roller 26 is supported by an axis 27 on one end of a lever 28 which is rotatably supported by a pivot 29 fixed to the base of the cartridge 23. The lever 28 is counterclockwise biased by a spring 30. A cutaway portion 31 of which function will be described later is formed on a portion of the leading edge of the cartridge 23. Retention members 34, 35 are provided on the deck 10 so that the cartridge may be snugly held in place when they are depressed in the direction of the arrow as shown and are inserted into notches 32, 33 formed in both sides of the cartridge. When the cartridge 23 is held by the retention members 34, 35 in the operative position, the pinch roller 26 is caused to abut against the capstan 11 under the influence of the spring 30 whereby the tape 24 is drivingly transported across the endmark detector 13 and the magnetic head 12 in cooperation with the capstan 11 and the pinch roller 26.

Figure 3:
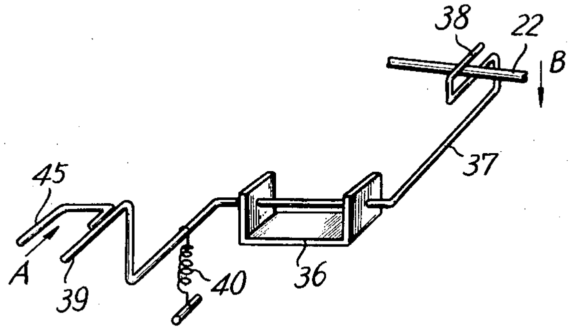
FIG. 3 is a perspective view of the shift means for moving the belt illustrated in FIG. 1, FIG. 4A and FIG. 4B are representations showing the tension control means for controlling the tension of the belt in FIG. 1.

A belt shift means is provided to selectively shift the belt 22 from one to another with respect to the pulleys 17, 18 and 19 for varying the driving speed of the tape 24 and which includes an actuating member 37 formed of wire or the like suitably bent and swingably supported by a substantially U-shaped supporter 36 fixed to the deck 10 thereunder. The actuating member 37 has one end portion 38 bent to embrace a portion of the belt 22 and the other end portion 39 which extends upwardly of the deck 10 and engageable with the leading edge of the cartridge inserted in the player. The actuating member 37 is urged by a spring 40 to the position where the belt 22 is trained to the small pulley 17. As seen from the drawing, the cartridge 23 is provided with the cutaway portion 31 at the leading edge thereof so that the other end portion 39 of the actuating member 37 may not engage the cartridge when in the operative position. With this arrangement, the belt 22 is maintained to be trained to the small pulley 17. In contrast, where another cartridge having no cutaway portion is held in the operative position, the leading edge of the cartridge is engaged by the end portion 39 thereby pressing the end portion 39 in the direction of the arrow A (FIG. 3). Then, the actuating member 37 is swung about the supporter 36 against the bias of the spring 40. This causes the belt 22 to move in the direction of the arrow B (FIG. 3) by means of the actuating member 37. As a result, the belt 22 is shifted from the small pulley 17 to the medium pulley 18 through the projecting part 20. By this shift, the rotational speed of the capstan 11 will be increased to thus accelerate the tape speed.

In the illustrative embodiment, the diameters of the small pulley 17 and the medium pulley 18 are in a ratio of 1 – 2, and the capstan 11 is rotatably driven by the motor 15 so as to drive the tape at speed of 4.75 cm/second when the belt 25 is trained to the small pulley 17 or at speed of 9.5 cm/second when the belt is trained to the medium pulley 18. One cartridge wherein the tape to be recorded at 4.75 cm/sec tape speed is used is provided with the cutaway portion at the leading edge of the cartridge whereas the other cartridge wherein the tape to be recorded at 9.5 cm/sec tape speed is used has no cutaway portion. From this it will be apparent that such cartridges are held in the operative position to suitably change the rotational speed of the capstan 11 to drive the tape in each cartridge at the same speed as that in recording.

Figure 5:
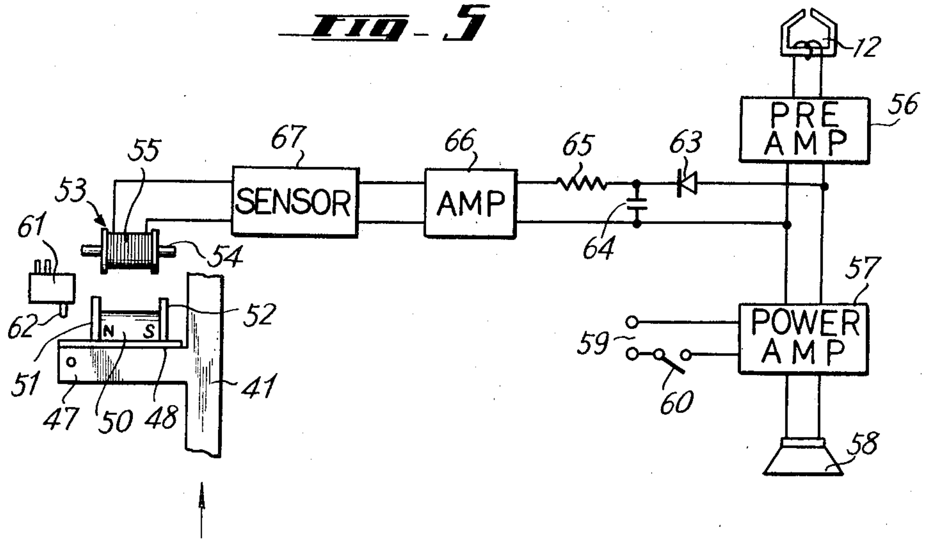
FIG. 5 is an explanatory view showing the control circuit for controlling the locking means of the operating lever in FIG. 1 and operation of the locking means thereof.

In order to drive the tape which has been driven at normal play speed at fast speed, it is only necessary to shift the belt 22 from the small pulley 17 or the medium pulley 18 to the large pulley 19. An operating means for shifting the belt 22 to the large pulley 19 includes an operating lever 41 swingably provided by guides 42, 43 on the deck 10. The operating lever 41 has one end extending outwardly of the player housing (not shown) and the other end opposed to the end of an arm 45 connected to the end portion 39 of the actuating member 37. A knob 44 is mounted to the operating lever 41 at one end thereof. The operating member 37 is normally urged at its rear end by a spring 46 to the position not to engage the arm 45. Now the knob 44 is depressed to slide the operative lever 41 against the bias of the spring 46, the operating lever 41 is caused to engage the arm 45 to swing the actuating member 37 through the arm 45 against the bias of the spring 40. Swingable movement of the actuating member 37 moves the belt 22 in the direction of the arrow B and the belt is shifted to the large pulley 19. The operating lever 41 may be depressed till the belt 22 is shifted to the large pulley 19 and the operating lever is retained by a lock means as will be seen from FIG. 5. The lock means comprises a permanent magnet 50 fixed to a bent portion 48 of a projection 47 of the operating lever 41, yokes 51, 52 fixed to both poles of the permanent magnet 50, and an electromagnet 53 mounted to the deck 10. The permanent magnet 50 and yokes 51, 52 are represented by numeral 49 in FIG. 1. The electromagnet 53 includes a core 54, and coil 55 wound to the core. When the tape is driven at normal speed, the permanent magnet 50 is spaced away from the electromagnet 53 as shown in FIG. 5. When the operating lever 41 is pressed in the direction of the arrow C for driving the tape at fast speed, the yokes 51, 52 contact the core 54 to close the magnetic circuit of the permanent magnet 50 to allow the yokes 51, 52 and the core 54 to be attracted by the magnetic force of the permanent magnet 50. Accordingly, even if pressure on the operating lever 41 is released, the operating lever 41 is not returned by the locking means to its original position irrespective of the bias of the spring 46. The belt 22 is trained to the large pulley 19 and the tape is driven at fast speed during the time that the operating lever 41 is retained by the lock means.

A schematic block diagram with the lock means in FIG. 5 constitutes a sensing circuit for producing the electric signal in response to non-signal zone between one record and a successive second zone on the tape when the endless magnetic tape is driven at fast speed. The electric signal produced from the sensing circuit is applied to the coil 55 of the electromagnet 53. The magnetic head 12 feeds a preamplifier 56. The output of the preamplifier 56 is applied to a power amplifier 57 which drives a speaker 58. The power amplifier 57 is connected by a switch 60 to a terminal 59 connected to an electrical power source (not shown). The switch 60 is contained in a micro-switch 61 fixed to the deck 10. The micro-switch 61 includes an actuator 62 operable by the projection 47 of the operating lever 41 when the operating lever 41 is retained by the lock means. The switch 60 is opened as shown during the time that the actuator 62 of the micro-switch has been depressed by the operative lever 41. Thus the speaker 58 does not produce a reproducing sound since the power amplifier 57 is not supplied with the current in driving the tape at fast speed and is maintained inoperative. The output of the pre-amplifier 56 may also be applied to a rectification circuit comprising a diode 63, condenser 64, and a resistor 65. The output signal, rectified by the rectification circuit, of the preamplifier 56 is amplified by an amplifier 66 and thereafter is applied to a sensor 67. The output signal is not generated in output side of the sensor 67 as the input signal exists in the sensor 67 but generated therein as the input signal decays. The sensor 67 is provided, for instance, by the Schmidt circuit. The coil 55 of the electromagnet 53 is connected to the output side of the sensor 67. While the record zone on the driving tape feeds through the magnetic head 12, the rectified reproducing signal is applied to the sensor 67 but the output signal is not produced in the output side of the sensor 67. The non-recorded zone on the tape passes through the magnetic head 12 to deprive the reproducing signal. As a result, the input signal of the sensor 67 decays upon lapse of time delay determined by a resistor 65 and the condenser 64. The output electric signal is thus produced in the output side of the sensor 67. This output electric signal is applied to the coil 55 of the electromagnet 53 to magnetize the coil. The direction and strength of the current drained to the coil is predetermined so as to allow the magnetic flux generated from the coil 55 to erase the magnetic flux of the permanent magnet 50 when the coil 55 is magnetized by the output electric signal from the sensor 67. Consequently, attractive between the yokes 51, 52 and the core 54 is diminished in response to magnetization of the coil 55 by the output electric signal from the sensor 67 whereby the operating lever 41 is returned to the original position by the bias of the spring 46. Retraction of the operating lever 41 to the original position allows the actuating member 37 to return to the position by the bias of the spring 46 where the belt 22 is shifted from the large pulley 19 to the medium pulley 18 or the small pulley 17. As a result, the tape speed is changed from fast to normal playing speed. Since the lever 41 is disconnected from operation of the actuator 62 of the micro-switch 61 by retraction of the operating lever 41 to the original position, the switch 60 is closed to actuate the power amplifier 57 and the reproducing sound on the tape driven at normal playing speed is produced from the speaker 58.

Figure 4A:
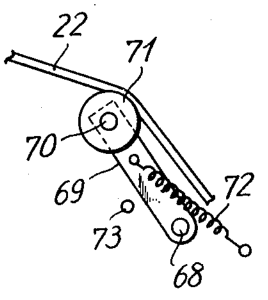

FIG. 4A illustrates a tension control means for providing suitable tension for the belt 22. The tension control means comprises an idler wheel 71 which is pivoted to a pivot 70 on the free end of a swingable lever 69 one end of which is pivoted to a pin 68 connected to the deck 10 thereunder and engageable with the belt 22 at side thereof. The swingable lever 69 is clockwise biased by a tension spring 72 while the idler wheel 71 is pressed against the belt 22 by the bias of the spring 72. Now when the belt 22 is shifted from the small pulley 17 to the medium pulley 18 or the large pulley 19, the idler wheel 71 is moved against the bias of the spring 72 in accordance with the tension of the belt 22. Therefore, if the belt 22 is shifted to the pulley 18 or 19, overtension is relieved. Numeral 73 designates a stopper pin for preventing the swingable lever 69 from swinging more than necessary when it is urged by the belt 22.

Figure 4B:
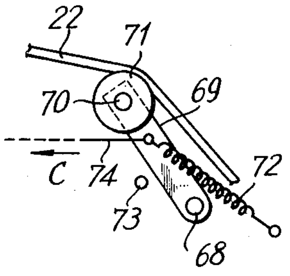

A tension control means is shown in FIG. 4B for automatically reducing or controlling the tension of the belt so as to allow the belt to be readily shifted from the pulley 17 to the pulley 18 or 19. In FIG. 4B, similar numerals are used to illustrate like parts in FIG. 4A. The tension control means shown in FIG. 4B is different from that in FIG. 4A and is coupled by a string 74 such as nylon thread to, for example, the actuating member 37 (FIGS. 1 and 3) at a portion thereof. When the actuating member 37 is swung in the direction that the belt 22 is shifted from the small pulley 17 to the large pulley 19, the string 74 is pulled in the direction of the arrow C to counterclockwise swing the swingable lever 69. Thus, the idler wheel 71 is forcedly away from the belt 22 to relieve the tension of the belt 22 thereby facilitating the shift of the belt 22 to the large pulley 19.

Although the invention has been described with reference to specific embodiments, it is apparent that the invention is not to be limited to the embodiments as illustrated, and, accordingly, changes and variations may be made without departing from the spirit and scope of the invention as defined in the appended claims.

What is claimed is:

1. In a tape speed changing apparatus in an endless magnetic tape cartridge player, including a magnetic tape reproducing circuit incorporating at least one magnetic head adapted to transduce the endless magnetic tape in a tape cartridge set in a predetermined operative position, a tape drive device for driving the tape in said cartridge in the operative position, and a deck for seating said cartridge, the improvement which comprises:

- a rotary drive capstan extending from said deck for driving the tape in the cartridge, said capstan carrying a flywheel attached thereto;
- an electrical motor for driving the capstan and having an output shaft; a small, medium and large pulley each connected to the output shaft;
- a belt extending between the small pulley and the flywheel for imparting rotation of the output shaft of the motor to the capstan; and
- a shift means for moving the belt so selectively shift the same to each of the pulleys, said shift means having a movable actuating member having a first portion engageable with the belt while allowing running of the belt, a second portion selectively engageable with a cartridge set in said operative position, said actuating member being operable to be selectively moved by said cartridge, said actuating member being urged by a bias means to a normal position where the belt is trained to a prescribed one of the pulleys, the belt being maintained to extend between said predetermined pulley and the capstan if said actuating means is not moved from said normal position by the cartridge set in said operative position, said shift means being operable to move said belt from said predetermined pulley to another pulley when said actuating member is moved from said normal position by a cartridge set in said operative position, the rotational speed of the capstan being changed to change the tape speed in response to the shift of the belt to said another pulley;

said shift means further including a manually operated operating lever mounted on said deck for sliding movement between an original position and a second position, spring means urging said operating lever to said original position, said actuating member having a third portion engageably opposed to said operating lever but out of engagement with said operating lever when said operating lever is in the original position, the operating lever being operable, when manually moved to the second position against the bias of said spring means, to engage said third portion of said actuating member and move the actuating member to the position where said belt is trained to said large pulley; and locking means for locking said operating lever in said second position to thereby maintain said belt to be trained to said large pulley to rotate said capstan at fast speed thereby driving the tape at fast speed during the time that the locking means retains the operating lever in said second position.

2. Apparatus according to claim 1, wherein said magnetic locking means comprises a permanent magnet provided on said operating lever, an electromagnet fixed to said deck, and a control circuit for the electromagnet, the locking means being operable to retain said operating lever and said actuating member in engagement by magnetic attraction between the permanent magnet and the core of electromagnet, the control circuit being operable to generate a magnetic flux in the coil to erase the magnetic flux of the permanent magnet when the coil of the electromagnet is excited by the control circuit thereby to disengage attraction of the core with the permanent magnet, the operating lever being operable to be returned to the original position by the bias of said spring when said coil is excited.

3. Apparatus according to claim 1, including a tension control means for elastically pressing the belt to control the tension of the belt.

4. A tape speed changing apparatus in accordance with claim 1, wherein said actuating member is adapted not to engage a cartridge having a cutaway portion formed on the leading edge of the cartridge when the cartridge is set in said operative position whereas said actuating member may engage a cartridge having no cutaway portion when in said operative position.

5. A tape speed changing apparatus in accordance with claim 2 wherein said control circuit includes a sensing means for producing an electrical signal in response to detection of non-record zone between one record zone and the next record zone on the tape, the output of the sensing means being applied to the coil of the electromagnet.

* * * * *